(12) United States Patent
Yatsenko et al.

(10) Patent No.: US 8,182,754 B2
(45) Date of Patent: May 22, 2012

(54) PLASMA APPARATUS FOR TERMINATION OF RADIOACTIVE AND OTHER WASTERS

(76) Inventors: Yuriy Yatsenko, Philadelphia, PA (US); Boris Avramchuk, Philadelphia, PA (US); Siarhei Zmitkovich, Philadelphia, PA (US); Roman Pankiv, Philadelphia, PA (US); Vadim Yatsenko, Shepetivka (UA)

( * ) Notice: Subject to any disclaimer, the term of this patent is extended or adjusted under 35 U.S.C. 154(b) by 0 days.

(21) Appl. No.: 13/200,774

(22) Filed: Sep. 30, 2011

(65) Prior Publication Data
US 2012/0020845 A1  Jan. 26, 2012

Related U.S. Application Data

(63) Continuation-in-part of application No. 12/287,137, filed on Oct. 6, 2008, now abandoned.

(51) Int. Cl.
*B01J 19/08* (2006.01)
(52) U.S. Cl. .......... 422/186; 422/71; 422/159; 110/237; 588/20; 204/156; 204/164
(58) Field of Classification Search .................. 422/186, 422/71, 159; 204/156, 164; 110/237; 588/20
See application file for complete search history.

(56) References Cited

U.S. PATENT DOCUMENTS 5,681,434 A * 10/1997 Eastlund ................. 204/156
2007/0215070 A1 * 9/2007 Yatsenko ................. 123/3
* cited by examiner

*Primary Examiner* — Jeffrey T Barton
*Assistant Examiner* — Xiuyu Tai
(74) *Attorney, Agent, or Firm* — Aleksandr Smuchkovich

(57) ABSTRACT

The apparatus is proposed for termination of radioactive and other wastes particularly for physical processing of radioactive waste with simultaneous production of hydrogen, oxygen, and electric energy. It includes an ion divider, a plasma chamber communicated with the ion divider, a controllable hydrogen-oxygen dispenser introducing hydrogen and oxygen into the plasma chamber, transformer pipe coils, a transformer chamber surrounded by the transformer coils, the transformer chamber communicated with the plasma chamber, equipment for supplying water and steam into the transformer coils, cooling equipment for receiving ionized steam from the transformer coils and cooling the steam, a sprayer receiving the ionized steam from the cooling equipment and introducing the steam into the ion divider; and dispenser equipment for introducing radio-active wastes and/or worked-out rocket fuels into the transformer chamber, wherein the radio-active wastes and/or worked-out rocket fuels are terminated. Supplemental equipment is also illustrated and described.

2 Claims, 5 Drawing Sheets

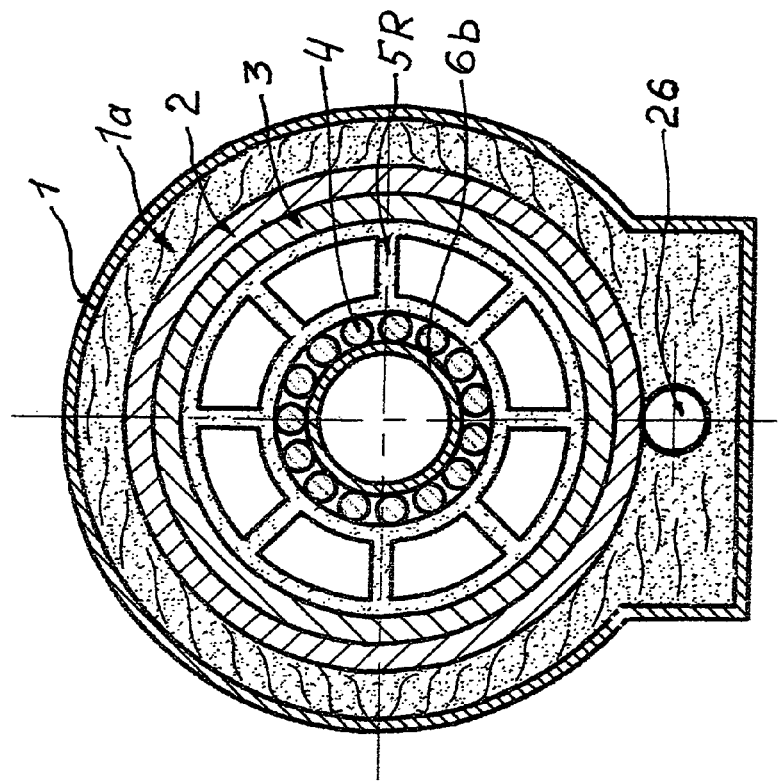
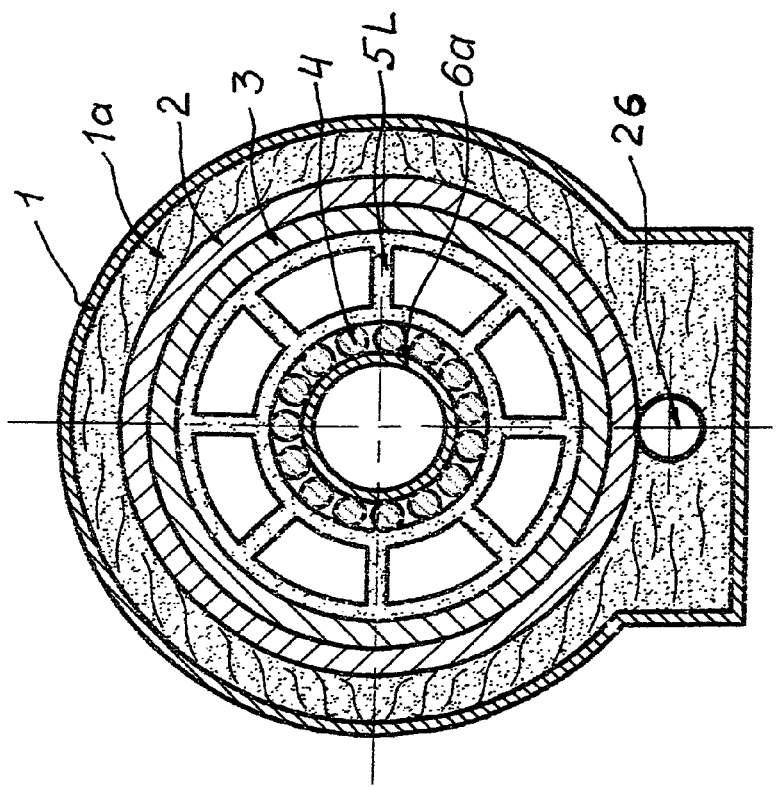

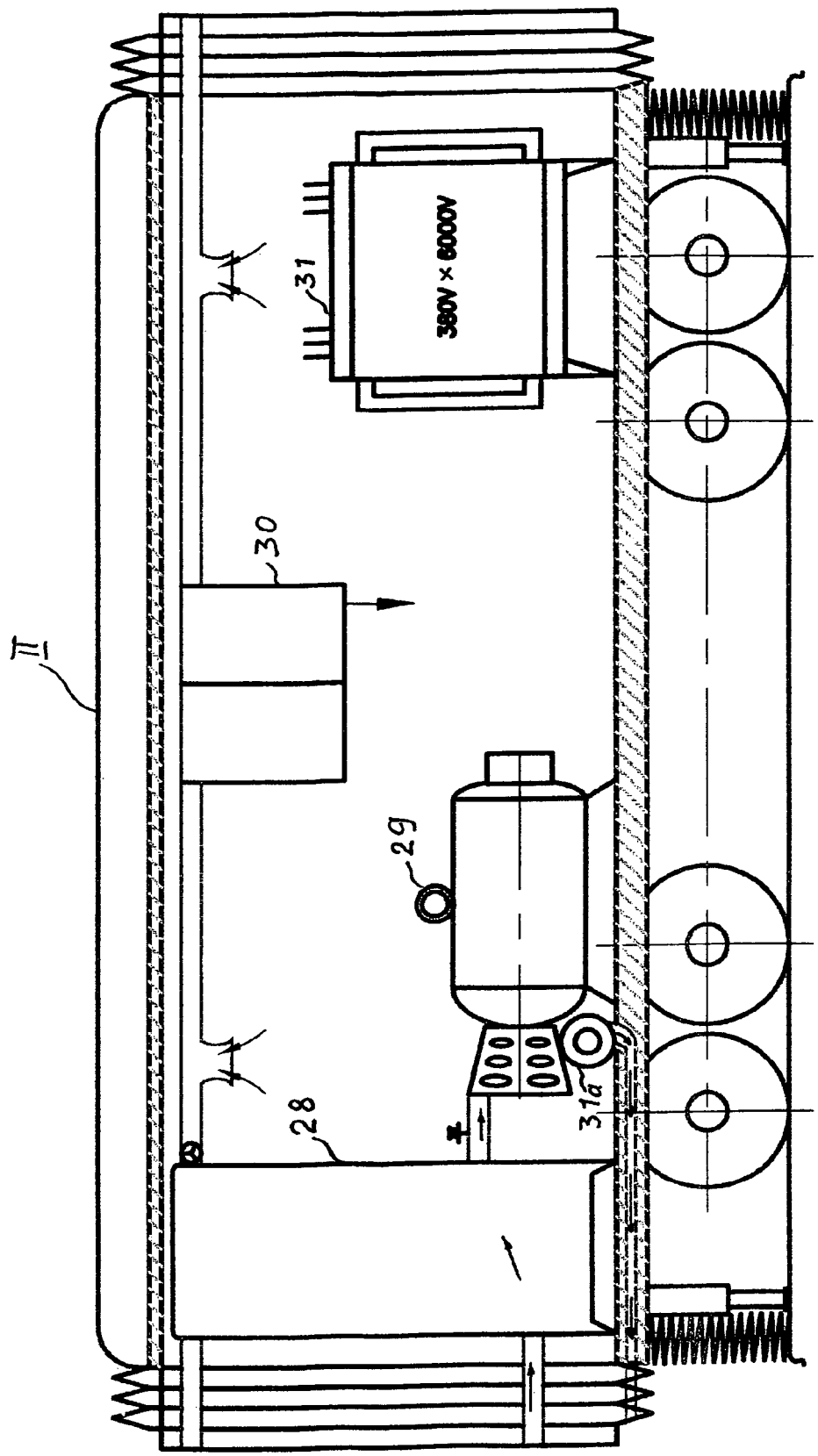

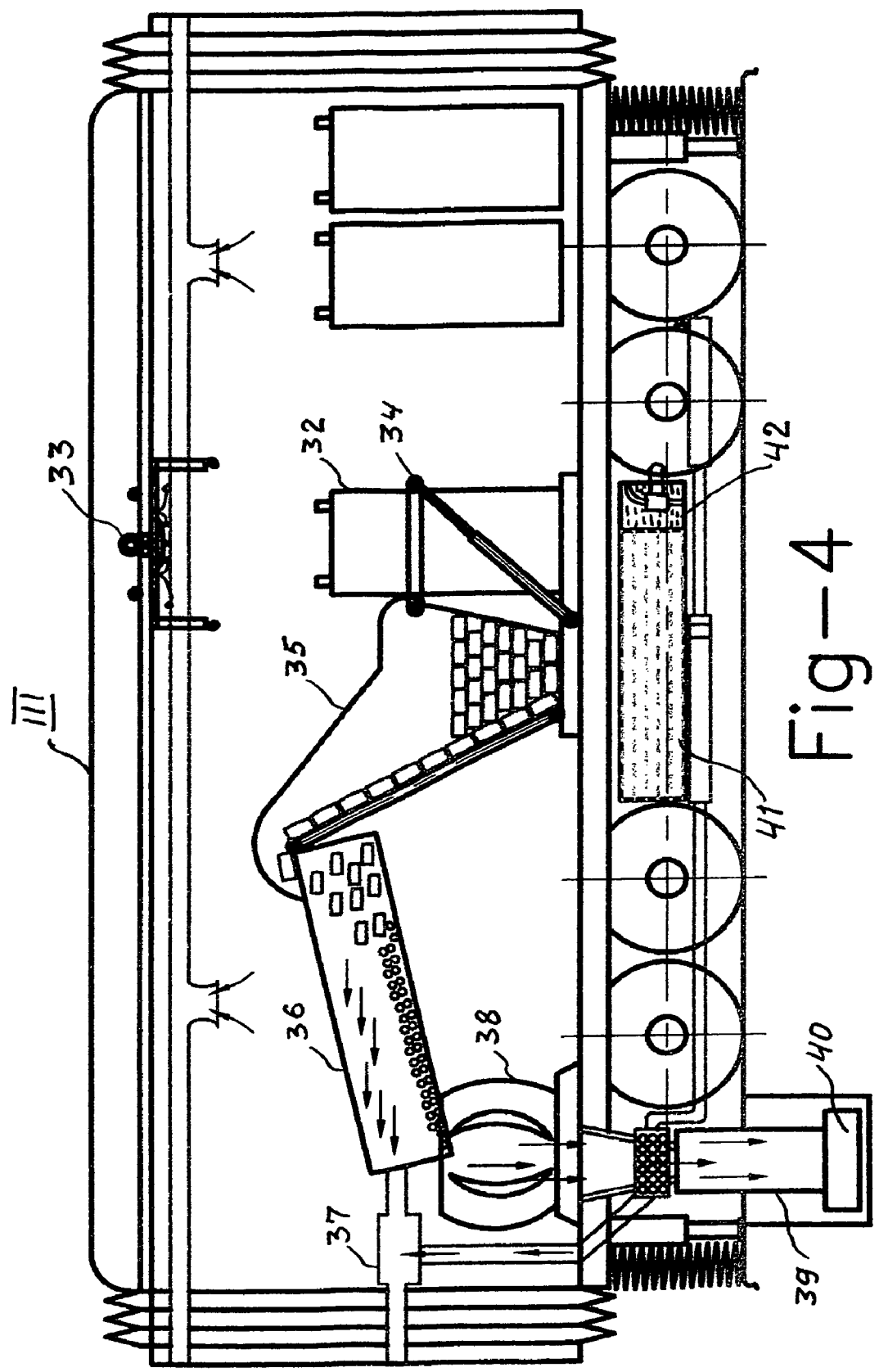

PLASMA APPARATUS FOR TERMINATION OF RADIOACTIVE AND OTHER WASTERS

CROSS-REFERENCE TO RELATED APPLICATIONS

This U.S. patent application is a continuation-in-part application of a U.S. patent application Ser. No. 12/287,137, filed on Oct. 6, 2008, entitled "Plasma Apparatus for Termination of Radioactive and Other Wastes", hereby incorporated by reference in its entirety, and claiming priority of the U.S. patent application Ser. No. 12/287,137 within the limits of disclosure thereof. The U.S. patent application Ser. No. 12/287,137 is hereby expressly abandoned.

TECHNICAL FIELD

The present invention relates to waste processing technologies, particularly to physical processing of radioactive waste with simultaneous production of hydrogen, oxygen, and electric energy.

BACKGROUND OF THE INVENTION

At present about 50,000 tons of nuclear reaction products, necessary for further processing and burring, are accumulated in various storages of atomic power plants in the world. Nuclear reactions usually consume from 0.5% to 3.5% of the nuclear fuel, and the rest goes into waste including nuclear fission products, such as cesium and strontium, which waste cannot be terminated, but can be "infinitely" kept in special storage. According to conventionally known requirements for radioactive safety and environment protection, a long-term storage and burring of the nuclear waste is permitted only after appropriate chemical processing.

However, the modern technology of conversion, concentration, removal, and burring of radioactive waste (RW), primarily nuclear fuel remainder, satisfying the aforesaid requirements, is the least developed stage in the whole nuclear fuel cycle. The RW to be burred is typically placed into special containers. The final stage of operation with the RW is the burring of the containers in geologic formations that are considered a major protective barrier of such burring. This is because the construction materials and materials of the containers' shells, usually utilized in the burring structures, cannot provide reliable protection of the environment from penetration of "long-living" radioactive elements.

Usually, a geologic RW storage is a complicated engineering construction disposed more than 60 meters under the ground level. The storage includes a burring space with a floor. Bore pits are drilled in the floor to store containers with RW of high specific radioactivity. A distance between the bore pits must be from 10 to 50 meters to satisfy the heat-withdrawal regime from the containers to avoid a nuclear disaster.

Such geologic storage is characterized in that mining rocks of the formations are intensely affected by a powerful ionizing radiation field with high temperatures. Interaction of the radiation with the geologic rocks results in reduction of the radiation field, but also in radiation defects in the material structure of the rocks, involving energy accumulation in the radiated material and a local temperature increase. Such processes, being accumulated, may alter natural properties of the rocks surrounding the RW, cause phase transitions, lead to emission of gases, and influence the structural integrity of the storage walls.

According to 'Short- and Medium-Term Management of Highly Radioactive Wastes in the United States' by Arjun Makhijani: "The United States Department of Energy (DOE) is simultaneously pursuing two inappropriate geologic repository projects for disposal of highly radioactive waste: The Waste Isolation Pilot Plant (WIPP) in New Mexico, which is supposed to "solve" the problem of wastes containing high concentrations of transuranic radionuclides, such as plutonium, mainly arising from the US nuclear weapons production program.[2] The Yucca Mountain repository in Nevada, which is being explored for its suitability for disposing of irradiated nuclear reactor fuel (also called spent fuel) and the high-level radioactive waste that results from the reprocessing of irradiated fuel. These two categories of waste, which often go under the single rubric of "high-level waste," together contain over 99 percent of all the radioactivity in all nuclear waste".

In another article, Mr. Arjun Makhijani describes alternative "Rejected High Level Waste Management Methods" (Science for Democratic Action, Volume 7, Number 3, May 1999) as follows:

TABLE 1

| Waste Disposal Method | Description | Reasons for Rejection |
|---|---|---|
| Liquid Injection[2] | Injection of liquid waste (sometimes mixed with grout) into wells hundreds of meters deep. | difficult to assess waste isolation lack of engineered barriers migration of contaminants through soil to water, possibly rapid |
| Rock Melting | Fill deep mined cavity with high-level waste so that surrounding rock is melted and encapsulates waste | high uncertainty about radionuclide migration difficult to assess waste isolation interaction of melted rock with host rock unknown specific techniques not developed inapplicable to older reprocessing waste with low heat |
| Ice Sheets | Direct melting of waste through ice to bedrock or surface facility pushed down through ice due to accumulating snow and ice | migration of ice formation of icebergs with waste durability of waste container system unknown pathways for waste migration unknown |
| Shoot it into Space | Place waste into space or put rocket on collision course with sun | danger of accident during launch large volumes of waste would entail many flights resulting in higher risks and higher costs reduction of volume to dispose only long-lived radionuclides requires separation technologies, which pose serious environmental and non-proliferation risks |

Source: Office of Technology Assessment 1985. Managing the Nation's Commercial High-Level Radioactive Waste. Washington, DC: U.S. Congress, Office of Technology Assessment, OTA-O-171, March 1985

As the above table shows, the mentioned alternative ways of utilization of the radioactive waste have significant drawbacks. Nowadays, the industry is still looking for reliable and effective ways for processing the RW.

BRIEF SUMMARY OF THE INVENTION

Referring to the attached drawings, the inventive apparatus for termination of radioactive and other wastes, comprises at least:
(a) an elongated casing (1—FIG. 1) having a first end and a second end;
(b) a sprayer (7—FIG. 1) receiving activated cooled steam containing hydrogen and oxygen ions; said sprayer is mounted at the first end of said casing;

(c) an ion divider (45—FIG. 1) communicating with said sprayer (7), said ion divider (45) receiving the activated cooled steam from said sprayer (7), and separating the hydrogen and oxygen ions;

said ion divider (45) includes:

an electrically conductive anode pipe (3—FIG. 1, 2, 2*a*) secured within said casing (1), being electrically isolated from said casing, and having a central longitudinal axis;

a first electrical insulator (5R—FIG. 2*a*) located in proximity of the first end of said casing (1), and a second electrical insulator (5L—FIG. 2); each said insulator is configured as an outer ring and an inner ring being concentric to the outer ring (FIG. 2, 2*a*); said outer and inner rings have centers located on said longitudinal axis, said outer and inner rings are joined by radial ribs (FIG. 2, 2*a*), wherein the outer ring is secured inside said anode pipe (3);

a cathode (4—FIG. 1, 2, 2*a*) comprising a plurality of electrically conductive rods disposed in parallel to each other and circumferentially around said longitudinal axis (FIG. 2, 2*a*); first ends of said rods are attached to an electrically conductive bushing (6*b*—FIG. 2*a*) fixed to said inner ring of the first insulator (5R), and second ends of said rods are attached to an electrically conductive tube (6*a*—FIG. 2) fixed to said inner ring of the second insulator (5L); said anode and said cathode are electrically fed by a high voltage source (shown on FIG. 1); (d) a plasma chamber (9) receiving hydrogen and oxygen ions separated within said ion divider (45), providing for a combustion reaction of the hydrogen and oxygen ions therein, and producing water steam; said plasma chamber (9) is located inside said casing (1), adjacently to said second electrical insulator (5L—FIGS. 1 and 2);

(e) a plurality of dispensers (22-26—FIG. 1) substantially introducing the radio-active wastes and worked-out rocket fuels into said plasma chamber;

(f) a plurality of first outer spiral transformer pipe-coils (12) and a plurality of first inner spiral transformer pipe-coils (13) receiving water pumped thereinto; said pluralities of first outer and inner pipe-coils are secured with said casing (1), and serve for preparation of a first portion of overheated water steam, said plurality of first inner spiral transformer pipe-coils (13) is disposed inside said plurality of first outer spiral transformer pipe-coils (12);

(g) a plurality of second outer spiral transformer pipe-coils (14) and a plurality of second inner spiral transformer pipe-coils (15) receiving water pumped thereinto; said plurality of second outer pipe-coils (14) are located internally in relation to the pipe-coils of said plurality of first inner coils (13); said plurality of second inner spiral transformer pipe-coils (15) is disposed inside said plurality of second outer spiral transformer pipe-coils (14); said pluralities of second outer and inner pipe-coils (14 and 15) serve for preparation of a second portion of overheated water steam further used for generating electrical energy; an interior space inside said plurality of second inner pipe-coils is defined as a transformer chamber; said transformer chamber is located adjacently to said plasma chamber (9) and receives products of said combustion reaction therefrom, the products of said combustion reaction are moved substantially by means of a suction turbine (16—FIG. 1) mounted at the second end of said casing (1); and (h) a cooler (47—FIG. 1) for receiving and cooling the first portion of overheated water steam thereby producing the activated cooled steam further passed to said sprayer (7). Supplemental equipment is also described herein below.

BRIEF DESCRIPTION OF DRAWINGS

FIG. 2 is a sectional view A-A of the apparatus, shown on FIG. 1.

FIG. 2*a* is a sectional view B-B of the apparatus shown on FIG. 1.

FIG. 3 is a general schematic view of supplemental equipment to the inventive apparatus shown on FIG. 1, mounted on a platform II.

FIG. 4 is a general schematic view of supplemental equipment to the inventive apparatus shown on FIG. 1, mounted on a platform III.

Identical reference numerals in general refer to the same elements on different drawings, unless otherwise specified in the description.

DESCRIPTION OF A PREFERRED EMBODIMENT OF THE INVENTION

Figure 1:
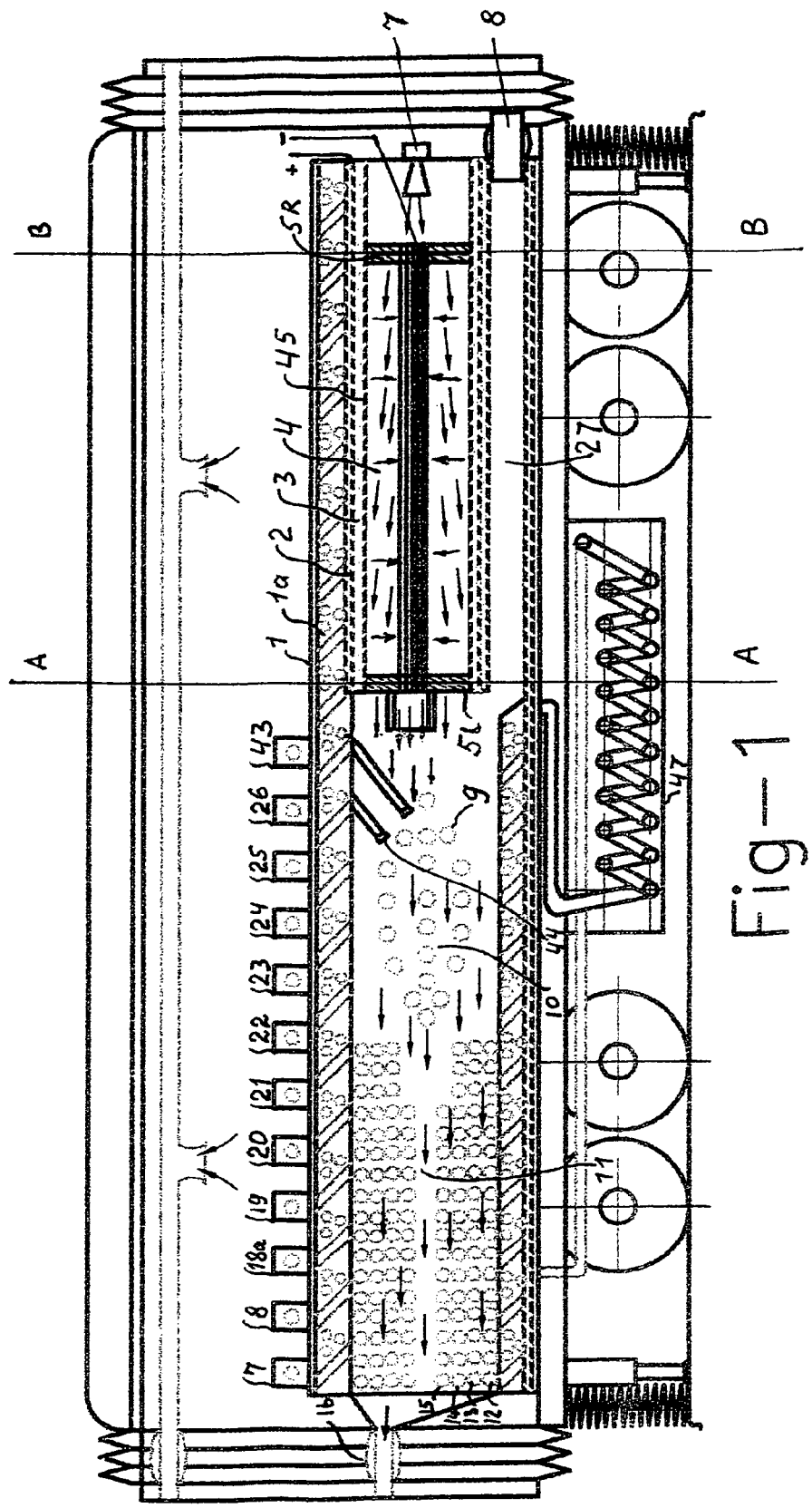
FIG. 1 is a general schematic view of a first core portion the inventive apparatus mounted on a platform I, according to a preferred embodiment of the present invention.

While the invention may be susceptible to embodiment in different forms, there is shown in the drawings, and will be described in detail herein, a specific embodiment of the present invention, with the understanding that the present disclosure is to be considered an exemplification of the principles of the invention, and is not intended to limit the invention to that as illustrated and described herein.

DESCRIPTION OF A PREFERRED EMBODIMENT OF THE INVENTION

As illustrated on FIGS. 1, 2, and 2*a*, the inventive apparatus comprises: a casing 1 mounted on a platform I. The platform I and other platforms described herein below can be made as a special train car, a trailer, or another suitable transportation means. In some embodiments the platforms can be made immovable, or represented by a stationary structure. The casing 1 encloses a fettling layer 1*a* typically employed for fireproof articles, which layer in turn covers a fire-clay layer 46. The fire-clay layer 46 has a shape of concaved cylinder in the left portion of the platform I, and a substantially top-positioned half-cylinder shape, in turn, covering a heat-insulation quartz pipe 2 in the upper region of the right portion of platform I.

The inventive apparatus comprises an ion divider 45 that includes: a metal (preferably steel) anode pipe 3 enclosed into the pipe 2.

In turn, the ion divider 45 includes: two electrical insulators: a left insulator 5L and a right insulator 5R, preferably made of ground quartzites. Each electrical insulator is configured as two concentric rings joined by radial ribs (shown on FIGS. 2 and 2*a*), wherein the outer ring is mounted inside the anode pipe 3. The inner ring of the left insulator 5L supports a short metal (preferably steel) tube (6*a*) fixed therein. The inner ring of the right insulator 5R supports a metal (preferably steel) bushing 6*b* fixed therein.

The ion divider 45 includes: a cathode 4 preferably consisting of a plurality of metal (preferably steel, preferably having a diameter of 20 mm) rods disposed in parallel to each other and circumferentially around a longitudinal axe extending through the centers of the left insulator 5L and the right insulator 5R. First ends of the cathode rods 4 are attached (preferably welded) to the bushing 6a, and second ends thereof are attached (preferably welded) to the tube 6b. The anode 3 and cathode 4 are electrically fed by a high voltage source (preferably 6000 volts) of direct current, which source in the preferred embodiment is represented by at least a turbo-generator 29 depicted on FIG. 3, and described herein further. In some embodiments a supplemental electric power source can be combined in parallel with the turbo-generator 29.

As indicated on FIG. 1, the inventive apparatus comprises: a supercharge turbine 8 mounted in the bottom region of casing 1; a plasma chamber 9 located to the left of the left insulator 5L (as shown on FIG. 1); a cooler 47 mounted preferably on the underside of the bottom of platform I to cool ionized steam introduced thereinto by a steam dispenser 18a; sprayers for introducing radioactive wastes 10; a transformer chamber 11 located to the left from the plasma chamber 9, as shown on FIG. 1.

The inventive apparatus comprises: a plurality of outer spiral transformer pipe-coils 12 and a plurality of inner spiral transformer pipe-coils 13, the pipe-coils 12 and 13 are mounted in the left region of the platform I (as illustrated on FIG. 1) preferably made of heat-resistant steel, and serve for preparation of overheating steam substantially having a temperature of 1200 degree C., which steam is decomposed into hydrogen and oxygen that are further separated in the ion divider 45.

As shown on FIG. 1, the apparatus comprises: a plurality of outer spiral transformer pipe-coils 14 and a plurality of inner spiral transformer pipe-coils 15, mounted in the left region of the platform I (as illustrated on FIG. 1) and located internally in relation to the pipe-coils 12 and 13; the pipe-coils 14 and 15 are preferably made of heat-resistant steel, and serve for generating electrical energy.

The inventive apparatus comprises: a suction turbine 16 and a ventilation turbine 16a mounted in the left terminal region of platform I, as depicted on FIG. 1; a dispenser 17 for introducing the RW not containing flammable additives; a dispenser 18 for introducing water into the transformers 12 and 13; a pump 18a for pumping water; a dispenser 19 for introducing the RW in a dust/powder form; a dispenser 20 for introducing the RW in a dry/friable form; a dispenser 21 for introducing the RW in forms of ether, aerosol, or vapor; a dispenser 22 for introducing the kerosene-containing RW; a dispenser 23 for introducing worked-out rocket fuels.

The apparatus comprises: a dispenser 26 for introducing activated cooled steam into a sprayer 7 that sprays it into the ion divider 45; a supercharger channel 27 connecting the turbine 8 with the plasma chamber 9; a dispenser 24 for introducing overheated steam into a vessel 28 (shown on FIG. 3); a dispenser 25 for introducing ground solid RWs into the plasma chamber 9. The dispensers 17-25 are mounted in the upper region of platform I.

The inventive apparatus comprises: dispensers 43 having two parallel channels for introducing hydrogen and oxygen during the start of the inventive apparatus; and an electrical ignition spark-plug 44.

Figure 5:
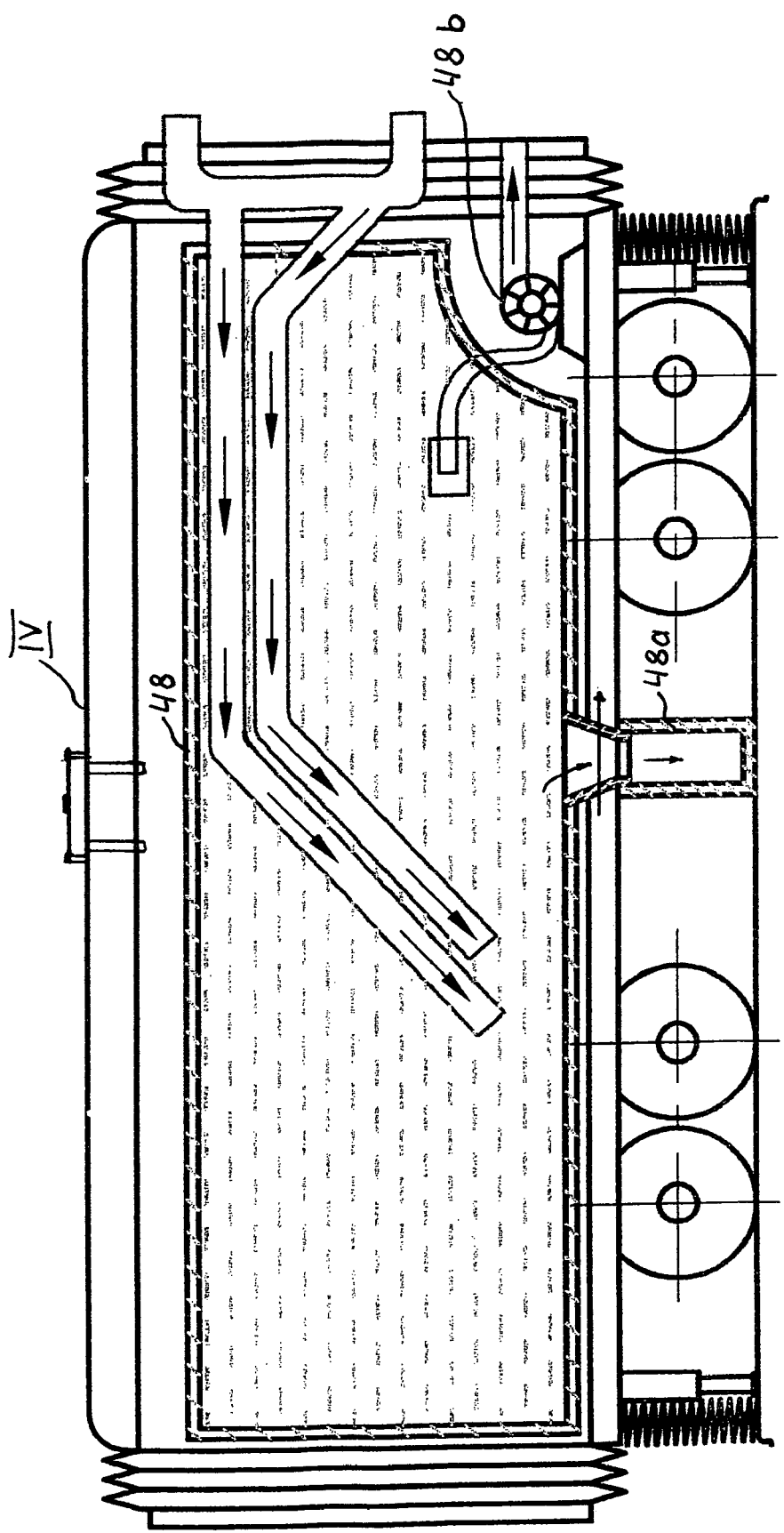
FIG. 5 is a general schematic view of a second portion the inventive apparatus mounted on a platform IV, according to a preferred embodiment of the present invention.

Another portion of the inventive apparatus is mounted on a platform IV, shown on FIG. 5. The portion includes a water container 48, mounted on the platform IV, a container for slime collection 48a, and a water pump 48b.

FIG. 3 depicts a first portion of supplemental equipment mounted on a platform II. The supplemental equipment comprises: the aforementioned high-pressure vessel 28 (shown on FIG. 3) for producing electrical energy. The vessel 28 is to keep pressure preferably of 250 atmospheres. It receives high-pressured overheated steam from the dispenser 24 (a corresponding duct is not illustrated).

The first portion of supplemental equipment comprises: the aforementioned turbo-generator 29, a conventional electro-control box 30, a conventional electro-transformer 31, a vacuum pump 31a for removal of exhaust steam and further returning it into the transformers 12, 13, 14, and 15.

A special platform III is displayed on FIG. 4. A second portion of supplemental equipment is mounted upon the platform III. The second portion of supplemental equipment comprises: containers for delivery of solid RW 32; a carrier device 33 for moving of the containers 32; a dumper 34 for emptying the containers 32; a feeding bunker 35 for receiving the solid RW from the containers 32; a ball mill 36 for receiving the solid RW and grinding thereof (the balls are made of materials that don't create sparks during operation); a vacuum pump for suction of dust particles 37 receiving the particles from the ball mill 36; an electromagnetic centrifuge 38 for deducing uranium and plutonium particles from the solid RW, which centrifuge 38 is fed with high voltage; a glass container 39 for loading the uranium and plutonium particles from the electromagnetic centrifuge 38: after the fulfillment of the container 39 with the uranium and plutonium particles it is filled with liquid glass from a device for dosage introduction of liquid glass 41 that conserves the radioactive particles; a transporter 40 for removal of the container 39 into storage; and a hydro-system 42 for expelling the liquid glass into the container 39.

Operation of the Preferred Embodiment

Hydrogen and oxygen are introduced into the plasma chamber 9 via the double-channel dispenser 43. The resultant mixture of hydrogen and oxygen are ignited by the spark-plug 44. The transformer chamber 11 and transformer pipe-coils 14 and 15 OR 12 and 13 heat up substantially to 1800 degree C. Water is pumped by the pump 48b from the container 48 (FIG. 5) into the transformer pipe-coils 12, 13, 14 and 15, wherein the water is subjected to thermo-impact and converted into ionized steam. The portion of the steam from the pipe-coils 14 and 15 is drawn into the vessel 28.

The pressure in the vessel 28 increases, and, at a magnitude of 250 atmospheres, the turbo-generator 29 is launched, and generates 6000 volts of direct current applied to the anode 3 and cathode 4.

At the same time, water enters the transformer pipe-coils 12 and 13 heated up to a lighting condition, wherein the water is converted into overheated steam, then the steam is decomposed into hydrogen and oxygen ions. The overheated steam is passed through the cooler 47, wherein its temperature is reduced to essentially 580 degree C. to be less than the self-igniting temperature of hydrogen (about 590 degree C.).

The ionized steam essentially of 580 degree C. is drawn into the sprayer 7 and introduced into the ion divider 45. The high voltage field of the ion divider 45 pushes the positive hydrogen ions into the cathode 4 and they are further introduced into the chamber 9. Simultaneously, the negative oxygen ions are attracted to the anode and drawn into the chamber 9. The ions of hydrogen and oxygen collide at the entrance area of the chamber 9, wherein the self-igniting of the hydrogen-oxygen mixture is occurred. At that moment, the inletting of hydrogen and oxygen via the double-channel dispenser 43 is terminated by a preprogrammed control device (not illustrated). The ratio of hydrogen/oxygen must not reach ⅛ that is the explosion condition. The RWs are supplied under a predetermined pressure preferably in the form of droplet mixture from the storage containers, and are terminated in the chamber 9.

The gases produced as a result of the reaction of hydrogen and oxygen, are further delivered into the vessel 48 filled with water (FIG. 5), wherein they ionize and heat up water, which water is further pumped by the pump 48b into the transformer pipe-coils 12, 13, 14 and 15.

The solid RW (often in the form of pills, containing ⅙ fraction of uranium and plutonium) are preliminary grinded in the ball mill 36 into dust-like particles. The dust-like particles are removed by the vacuum suction pump 37 via the dispenser 19 and further supplied into the plasma chamber 9. After high voltage in the centrifuge 39 is taken off, the ⅙ fraction of uranium and plutonium falls into the container 39, wherein liquid glass is introduced from the device for dosage of liquid glass 41 that conserves the RW radiation.

We claim:

1. An apparatus for termination of radioactive wastes and worked-out rocket fuels, said apparatus comprising:
    (a) an elongated casing having a first end and a second end;
    (b) a sprayer receiving activated cooled steam containing hydrogen and oxygen ions; said sprayer is mounted at the first end of said casing;
    (c) an ion divider communicating with said sprayer, said ion divider receiving the activated cooled steam from said sprayer, and separating the hydrogen and oxygen ions, said ion divider includes:
        an electrically conductive anode pipe secured within said casing, being electrically isolated from said casing, and having a central longitudinal axis;
        a first electrical insulator located in proximity of the first end of said casing, and a second electrical insulator; each said insulator is configured as an outer ring and an inner ring being concentric to the outer ring; said outer and inner rings have centers located on said longitudinal axis, said outer and inner rings are joined by radial ribs, wherein the outer ring is secured inside said anode pipe;
        a cathode comprising a plurality of electrically conductive rods disposed in parallel to each other and circumferentially around said longitudinal axis; first ends of said rods are attached to an electrically conductive bushing fixed to said inner ring of the first insulator, and second ends of said rods are attached to an electrically conductive tube fixed to said inner ring of the second insulator; said anode and said cathode are electrically fed by a high voltage source;
    (d) a plasma chamber receiving hydrogen and oxygen ions separated within said ion divider, providing for a combustion reaction of the hydrogen and oxygen ions therein, and producing water steam; said plasma chamber is located inside said casing, adjacently to said second electrical insulator;
    (e) a plurality of dispensers substantially introducing the radio-active wastes and worked-out rocket fuels into said plasma chamber;
    (f) a plurality of first outer spiral transformer pipe-coils and a plurality of first inner spiral transformer pipe-coils receiving water pumped thereinto; said pluralities of first outer and inner pipe-coils are secured with said casing, and serve for preparation of a first portion of overheated water steam, said plurality of first inner spiral transformer pipe-coils is disposed inside said plurality of first outer spiral transformer pipe-coils;
    (g) a plurality of second outer spiral transformer pipe-coils and a plurality of second inner spiral transformer pipe-coils receiving water pumped thereinto; said plurality of second outer pipe-coils are located internally in relation to the pipe-coils of said plurality of first inner coils; said plurality of second inner spiral transformer pipe-coils is disposed inside said plurality of second outer spiral transformer pipe-coils; said pluralities of second outer and inner pipe-coils serve for preparation of a second portion of overheated water steam further used for generating electrical energy; an interior space inside said plurality of second inner pipe-coils is defined as a transformer chamber; said transformer chamber is located adjacently to said plasma chamber and receives products of said combustion reaction therefrom, the products of said combustion reaction are moved substantially by means of a suction turbine mounted at the second end of said casing; and
    (h) a cooler for receiving and cooling the first portion of overheated water steam thereby producing the activated cooled steam further passed to said sprayer.

2. The apparatus according to claim 1, wherein:
    said apparatus further comprising means for heat insulation disposed between said casing and said anode;
    said first and second insulators are made of ground quartzites;
    said electrically conductive rods are made of steel having a diameter of 20 mm; and
    said high voltage source is represented by at least a turbo-generator powered substantially by said second portion of overheated water steam.

* * * * *